Feb. 22, 1966  JAMES E. WEBB  3,236,066
ADMINISTRATOR OF THE NATIONAL AERONAUTICS
AND SPACE ADMINISTRATION
ENERGY ABSORPTION DEVICE

Filed April 13, 1964

CARL A. FREDRICKSON
INVENTOR.

BY

ATTORNEYS

Feb. 22, 1966          JAMES E. WEBB            3,236,066
     ADMINISTRATOR OF THE NATIONAL AERONAUTICS
              AND SPACE ADMINISTRATION
Filed April 13, 1964    ENERGY ABSORPTION DEVICE
                                              2 Sheets-Sheet 2
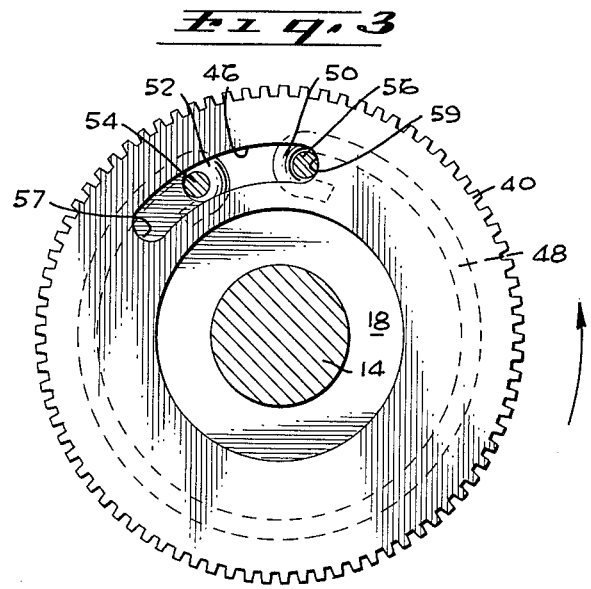
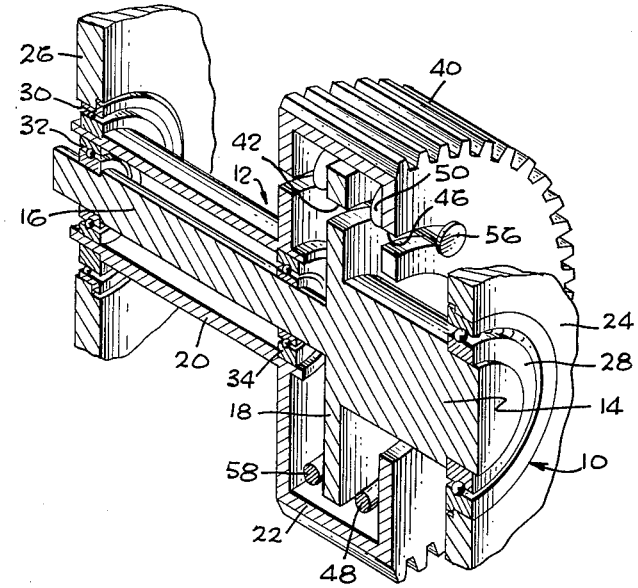
INVENTOR.
CARL A. FREDRICKSON
BY
*P. H. O'Brien*
*Charles C. Wells*
ATTORNEYS

United States Patent Office 3,236,066
Patented Feb. 22, 1966

3,236,066
ENERGY ABSORPTION DEVICE
James E. Webb, Administrator of the National Aeronautics and Space Administration with respect to an invention of Carl A. Fredrickson
Filed Apr. 13, 1964, Ser. No. 359,532
5 Claims. (Cl. 64—27)

This invention relates to improved power transmission devices employed in a gear train between the drive gear or motor and the final output gear or output shaft. More particularly, this invention relates to an energy absorption device employed in a high precision gear train to protect against damage to components of the gear train due to stop loads generated when there is a sudden stoppage of the output shaft or gear.

There are many devices available, slip clutches and other types of resilient drive connections, which are designed to protect the components of a drive train against suddenly exerted high torques. These devices, while possessing varying degrees of effectiveness, are relatively complicated and have many disadvantages which are eliminated by the present invention. For example, when a conventional slip clutch is employed in a gear train and the output shaft has had a stoppage, the indexing between the output shaft and the remainder of the gear train is lost. This loss of indexing does not occur when the present invention is used. Further, the present invention is not affected by the presence of lubricants or temperature variations as are slip clutches. An additional advantage is that the invention is of relatively simple construction, has no backlash, and operates in both directions of rotation.

The advantageous mode of operation and structural simplicity is accomplished, briefly, by providing an energy absorption device which includes an output shaft, a hollow gear which surrounds the output shaft, and a pair of springs which are connected between the hollow gear and output shaft to form a resilient driving connection therebetween. The springs are preloaded to match the maximum input torque that will be applied to either the output shaft or the hollow gear during normal operation thereof and thus the energy absorption device is operative only when very high torques are applied thereto.

It is a principal object of this invention to provide an energy absorption device for a gear or drive train which becomes operative only in response to very high torques such as would be generated when a stoppage occurs in the drive train.

It is a further object of this invention to provide an energy absorption device which has no backlash and operates in both directions of rotation.

A yet further object of this invention is to provide an energy absorption device which is constructed and arranged such that the components thereof are unaffected by lubricants and temperature variations.

Other objects and advantages of the present invention will become more apparent when considering the following detailed description in conjunction with the accompanying drawings; wherein:

FIG. 3 is a view similar to FIG. 2 which illustrates the components of the energy absorption device in a deflected position.

FIG. 4 is an isometric view, in cross section, taken along lines 4—4 of FIG. 2.

Figure 1:
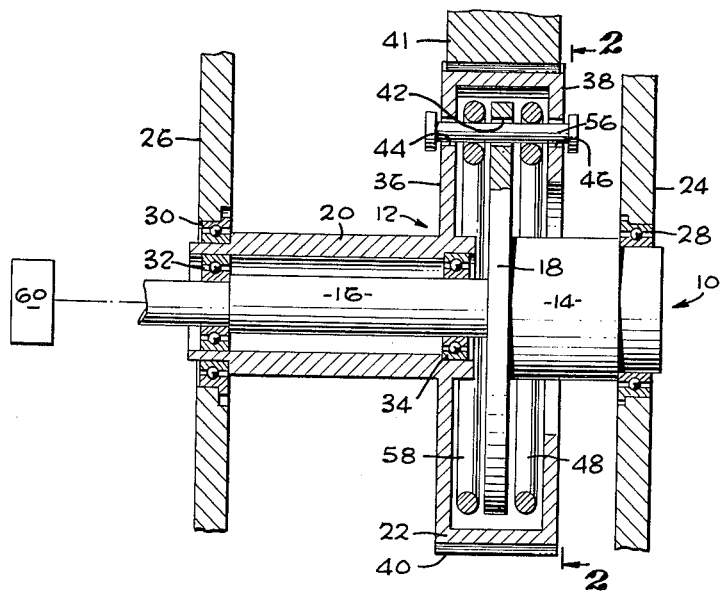
FIG. 1 is a cross sectional view of the energy absorption device taken along lines 1—1 of FIG. 2.

Referring now to the drawings wherein like numerals designate like elements in each of the several views. The energy absorption device, as illustrated in FIGS. 1 and 4, includes an output shaft 10 and a hollow gear 12 which substantially encloses output shaft 10. The output shaft is composed of a large diameter end section 14, a smaller diameter section 16 making up the other end thereof and a circular, radially extending flange portion 18 therebetween. The hollow gear 12 includes a cylindrical portion 20 surrounding end section 16 of the output shaft and a second cylindrical portion 22 which substantially surrounds flange portion 18 of the output shaft.

Output shaft 10 and hollow gear 12 are journalled for rotation in wall members 24 and 26 in such a manner that they rotate together or independently of one another. This is accomplished by journalling the large end of the output shaft in wall member 24 by means of bearing 28. Cylindrical portion 20 of the hollow gear is journalled in wall member 26 by bearing 30. A bearing 32 is mounted between cylindrical portion 20 of the hollow gear and end section 16 of the output shaft. Another bearing 34 is positioned between the cylindrical portion 20 of the hollow gear and end section 16 of the output shaft at a point adjacent flange portion 18.

A vertical wall member 36 connects one end of cylindrical portion 22 to cylindrical portion 20 and the other end of cylindrical portion 22 terminates in a wall portion 38 which extends inwardly toward the output shaft. Wall members 36 and 38 are parallel to and spaced from flange portion 18 of the output shaft. The outer periphery of cylindrical portion 22 has gear teeth 40 formed thereon which engage a gear 41 to form a driving connection therebetween. It is obvious that the hollow gear 12 would have to be made in two or more parts to permit insertion of the output shaft therein. However, since there are many different ways the hollow gear can be assembled, the construction details are not illustrated herein.

Flange portion 18 of the output shaft has an arcuate slot 42 formed therein adjacent to and concentric with the periphery of the flange portion. Wall members 36 and 38 each have arcuate slots 44 and 46 formed therein that are in alignment with the arcuate slot formed in the flange portion of the output shaft.

A circular spring 48 is disposed within the space between flange portion 18 and wall member 38. The spring is composed of a rod of spring steel and each end thereof is curved to form hook portions 50 and 52. A pair of pins 54 and 56 are positioned within the arcuate slots and each of the pins are engaged by hook portions 50 and 52 of spring 48. The spring 48 is stressed or preloaded when the hook portion thereof are engaged with pins 54 and 56 and thus pin 54 is pulled against end 57 of the arcuate slot by spring 48 and pin 56 is pulled against the other end 59 of the arcuate slot. A second circular spring 58, which is identical to spring 48, is disposed within the space between wall member 36 and flange portion 18, and engages pin members 54 and 56 in the same manner as does spring 48. The pins 54 and 56 have enlarged head portions suitably attached at each end thereof to prevent the pins from slipping from the arcuate slots during operation of the energy absorption device.

In FIG. 1 the output shaft is connected by a dotted line to a load 60 which could be a pump, compressor or any other driven mechanism. Inasmuch as the type of load or mechanism which could be operated with the present invention could vary widely, the load is shown here only in block form for purposes of illustration.

Figure 2:
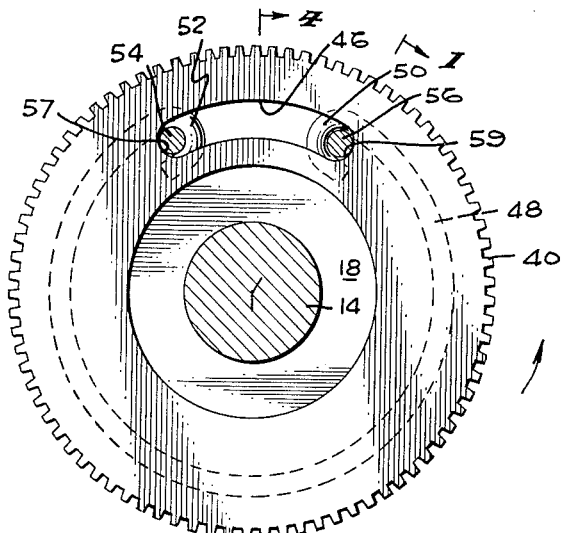
FIG. 2 is an end view taken along lines 2—2 of FIG. 1.

In operation, assuming the hollow gear is being driven by gear 41 in the direction of rotation illustrated by the arrow in FIGS. 2 and 3. This description of operation will refer only to the position of pins 54 and 56 within arcuate slots 42 and 46, but it should be understood that the position of the pins in arcuate slot 44 will be the same as their position in arcuate slot 46. When hollow gear 12 is rotated by gear 41 the end of slot 46 impinges on pin 56. Springs 48 and 58 are of such strength that they will not deflect under normal starting torques and thus the force applied to pin 56 will be transferred through springs 48 and 58 to pin 54. Pin 54 will then bear against the end of slot 42 in the flange of the output shaft whereby the output shaft will, under normal operating conditions, rotate in unison with the hollow gear.

When a stoppage occurs in the load and rotation of the output shaft is stopped, the spring connection permits relative movement between the hollow gear and output shaft as illustrated in FIG. 3. This occurs as follows: the output shaft and thus the flange portion are stopped, but force is still being applied to hollow gear 12 by gear 41. Hence, the end of arcuate slot 46 is sill bearing against pin 56 and the force being applied thereto is transferred through spring 48 to pin 54. Pin 54 cannot move in the direction of the force being applied since it is held stationary by one end of slot 42 in flange portion 18. Pin 56, however, is held against movement with respect to flange portion 18 only by springs 48 and 58 and these springs are preloaded such that they will be deflected by the force applied thereto by pin 56 in the event of a stoppage.

The manner in which the springs deflect is illustrated with dotted lines in FIG. 3. The amount of spring deflection possible and thus the amount of rotation of the hollow gear relative to the output shaft, is limited to the distance between the hook portions on the ends of each spring.

It is apparent that the present invention provides a device that permits the components of a gear train to be brought to a cushioned stop rather than a sudden stop which would generate high impact or stop loads and result in broken components. Further, after the hollow gear 12 and other components of the gear train have been brought to a cushioned stop, and the cause of the stoppage removed, the action of springs 48 and 58 will return the components of the gear train to their original position with no loss of indexing therebetween.

This completes the description of a preferred embodiment of the invention; however, to those skilled in the art there will be many obvious changes and modifications which can be made without departing from the spirit and scope of the invention as defined in the appended claims.

What is claimed is:
1. An energy absorption device comprising:
 (a) a rotable shaft having a circular, radially extending flange thereon, said flange having an arcuate slot therein;
 (b) a drive member rotable relative to said shaft, said driven member having arcuate slots therein which are normally in register with the slot in said flange; where
 (c) a pair of floating pins disposed in said arcuate slots providing a driving connection between said shaft and drive member whereby said output shaft and drive member will normally revolve together;
 (d) spring means biasing said pins away from each other under normal operations the pins approaching each other in opposition to the bias when said shaft has a stoppage thereby permitting partial rotation of said drive member relative to said shaft.

2. An energy absorption device for use in a gear train to protect against stop loads generated when a stoppage occurs in the gear train, said device comprising:
 (a) an output shaft journaled for rotation at each of its two ends;
 (b) said output shaft including a circular, radially extending flange intermediate the ends thereof;
 (c) said circular flange having an arcuate slot therein adjacent to and concentric with the periphery thereof;
 (d) a drive member journalled for rotation with said output shaft;
 (e) said drive member including a first cylindrical portion of one diameter surrounding one end of said output shaft and a second cylindrical portion having a greater diameter surrounding the circular flange of said output shaft;
 (f) said second cylindrical portion including a first wall member connecting one end of said second cylindrical portion to said first cylindrical portion, and a second wall member extending from the other end of said second cylindrical portion inwardly toward the longitudinal axis of said output shaft;
 (g) said first and second wall members being disposed on opposite sides of, and spaced from, the circular flange;
 (h) said first and second wall member having arcuate slots formed therein which are in alignment with the slot in the circular flange;
 (i) a pair of pin members mounted through the slots in the circular flange and the first and second wall members;
 (j) a first spring means disposed between said circular flange and said first wall member;
 (k) a second spring means disposed between said circular flange portion and said second wall member;
 (l) said first and second spring means being connected to the pair of pin members whereby said drive member will normally drive said output shaft, but can rotate with respect to said output shaft when said output shaft has a stoppage.

3. The energy absorption device recited in claim 2 wherein:
 (a) the second cylindrical portion of said drive member has gear teeth formed on the outer periphery thereof for engagement with other components of the gear train.

4. The energy absorption device recited in claim 2 wherein:
 (a) said first and second springs are composed of a rod of spring steel, and
 (b) said rods have a hook-shaped portion on each of their ends for engagement with the pin members.

5. An energy absorption device which comprises:
 (a) a hollow rotatable drive member having a pair of substantially parallel walls each of which has an arcuate slot therein;
 (b) an output shaft, rotatable relative to said drive member, having a circular radially extending flange thereon which is disposed between the walls of said drive member;
 (c) said flange having an arcuate slot therein which normally is in register with the slots in said walls;
 (d) a pair of pins disposed within and spanning the distance between the arcuate slots of said drive member and flange which provides the driving connection between said drive member and said output shaft;
 (e) at least one preloaded spring having a pair of ends, the spring being located in said drive member, one end of which is connected to one pin and the other end connected to the other pin so as to bias the pins to the extreme ends in said slots to thereby provide an energy absorption connection between said output shaft and said drive member during initial start-up of said drive member and in the event of stoppage of said output shaft.

References Cited by the Examiner

UNITED STATES PATENTS

| | | | |
|---|---|---|---|
| 1,005,191 | 10/1911 | Gaddie | 64—27 |
| 1,146,495 | 7/1915 | Hamel | 64—27 |
| 1,751,228 | 3/1930 | Bethel | 64—27 |
| 2,031,608 | 2/1936 | Kiel | 74—411 |
| 2,336,307 | 12/1943 | Slye | 64—27 |
| 2,668,426 | 2/1954 | Hoover | 64—29 |
| 2,793,515 | 5/1957 | Hunstiger et al. | 64—27 |

BROUGHTON G. DURHAM, *Primary Examiner.*

HALL C. COE, *Examiner.*